United States Patent
Petrica et al.

(10) Patent No.: US 11,593,547 B1
(45) Date of Patent: Feb. 28, 2023

(54) PREDICTION AND OPTIMIZATION OF MULTI-KERNEL CIRCUIT DESIGN PERFORMANCE USING A PROGRAMMABLE OVERLAY

(71) Applicant: Xilinx, Inc., San Jose, CA (US)

(72) Inventors: Lucian Petrica, Dublin (IE); Mario Daniel Ruiz Noguera, Dublin (IE)

(73) Assignee: Xilinx, Inc., San Jose, CA (US)

( * ) Notice: Subject to any disclaimer, the term of this patent is extended or adjusted under 35 U.S.C. 154(b) by 15 days.

(21) Appl. No.: 17/411,484

(22) Filed: Aug. 25, 2021

(51) Int. Cl.
- *G06F 30/392* (2020.01)
- *G06F 30/31* (2020.01)
- *G06F 30/347* (2020.01)
- *G06F 30/34* (2020.01)
- *G06F 111/04* (2020.01)

(52) U.S. Cl.
CPC ............ *G06F 30/392* (2020.01); *G06F 30/31* (2020.01); *G06F 30/34* (2020.01); *G06F 30/347* (2020.01); *G06F 2111/04* (2020.01)

(58) Field of Classification Search
CPC ...................................... G06F 30/392
USPC ........................................ 716/118
See application file for complete search history.

(56) References Cited

U.S. PATENT DOCUMENTS

| | | |
|---|---|---|
| 7,197,445 B1 | 3/2007 | Deepak |
| 7,302,377 B1 | 11/2007 | Deepak |
| 7,330,808 B1 | 2/2008 | Jorgensen |
| 7,451,417 B1 | 11/2008 | Campbell |
| 7,590,137 B1 | 9/2009 | Chan |
| 7,636,653 B1 | 12/2009 | Chan |
| 7,673,201 B1 | 3/2010 | Chan |
| 7,707,019 B1 | 4/2010 | Ballagh |
| 7,721,090 B1 | 5/2010 | Deepak |
| 7,739,092 B1 | 6/2010 | Ballagh |
| 7,895,026 B1 | 2/2011 | Kelly |
| 7,930,162 B1 | 4/2011 | Chan |
| 8,041,553 B1 | 10/2011 | Hernandez |
| 8,074,077 B1 | 12/2011 | Neema |
| 8,195,441 B1 | 6/2012 | Ou |

(Continued)

OTHER PUBLICATIONS

Ruoshi Li, et al., Optimizing Memory Performance of Xilinx FPGAs under Vitis, Oct. 18, 2020, 12 pages.

(Continued)

*Primary Examiner* — Eric D Lee
(74) *Attorney, Agent, or Firm* — Kevin T. Cuenot

(57) ABSTRACT

Predicting performance of a circuit design includes determining memory access patterns of kernels of the circuit design for implementation in an integrated circuit (IC) and generating a plurality of different floorplans. Each floorplan specifies a mapping of memory interfaces of the kernels to memories of the selected IC and an allocation of the kernels to a plurality of programmable pattern generator (PPG) circuit blocks of a circuit architecture implemented in the IC. The plurality of different floorplans are executed using the circuit architecture in the IC. The plurality of PPG circuit blocks mimic the memory access patterns of the kernels for each of the plurality of different floorplans during the executing. One or more design constraints are generated based on a selected floorplan. The selected floorplan is selected from the plurality of different floorplans based on one or more performance metrics determined from the executing.

20 Claims, 10 Drawing Sheets

(56) References Cited

U.S. PATENT DOCUMENTS

| | | |
|---|---|---|
| 8,224,638 B1 | 7/2012 | Shirazi |
| 9,081,925 B1 | 7/2015 | Schumacher |
| 9,117,043 B1 | 8/2015 | Huang |
| 9,529,946 B1 | 12/2016 | Schumacher et al. |
| 9,608,871 B1 | 3/2017 | Schumacher et al. |
| 10,296,673 B1 | 5/2019 | Ghosh et al. |
| 10,437,949 B1 | 10/2019 | Mihalache et al. |
| 10,691,580 B1 | 6/2020 | Kasat et al. |
| 10,816,600 B1 | 10/2020 | Liddell et al. |
| 2013/0132684 A1* | 5/2013 | Ostrovsky ........... G06F 11/3471 711/147 |

OTHER PUBLICATIONS

Zeke Wang, et al., Shuhai: Benchmarking High Bandwidth Memory on FPGAs, 2020 IEEE 28th Annual International Symposium on Field-Programmable Custom Computing Machines (FCCM), 9 pages.
James Lucero, et al., Designing High-Performance Video Systems with the Zynq-7000 All Programmable SoC Using IP Integrator, Xilinx, XAPP1205 (v1.0) Mar. 28, 2014, 15 pages.

* cited by examiner

PREDICTION AND OPTIMIZATION OF MULTI-KERNEL CIRCUIT DESIGN PERFORMANCE USING A PROGRAMMABLE OVERLAY

TECHNICAL FIELD

This disclosure relates to integrated circuits (ICs). More particularly, this disclosure relates to predicting performance of multi-kernel circuit designs and determining suitable floorplans for multi-kernel circuit designs for implementation in ICs based on the predicted performance.

BACKGROUND

A circuit design to be implemented in an integrated circuit (IC) often includes multiple different kernels that communicate with one another and/or with a host computing device through memory located on the IC itself or memory external to the IC. In many cases, the kernels are developed on an individual basis. That is, each kernel is developed as a design, e.g., a user design, intended to be implemented in the IC as circuitry to perform a particular task or function. The kernels may be developed using a hardware description language or a high-level programing language (e.g., as an application) that may be converted to hardware description language using High-Level Synthesis.

Computer-based implementation tools are capable of providing an estimate of the performance that may be achieved by an individual kernel. While such estimates may provide an acceptable level of accuracy for a single kernel operating in an IC in isolation, these estimates are often overly optimistic when implementing more than one kernel within the IC as a group or system. In such cases, the different kernels implemented in the IC concurrently compete for access to memory resources of the IC. This competition often degrades performance of the individual kernels such that the overall system performance obtained by the IC is less than initially estimated and/or less than desired.

SUMMARY

In one or more example implementations, a method includes determining, using computer hardware, memory access patterns of a plurality of kernels of a circuit design for implementation in an integrated circuit. The method includes generating, using the computer hardware, a plurality of different floorplans. Each floorplan specifies a mapping of memory interfaces of the plurality of kernels to memories of the integrated circuit and an allocation of the plurality of kernels to a plurality of programmable pattern generator circuit blocks of a circuit architecture implemented in the integrated circuit. The method includes executing the plurality of different floorplans using the circuit architecture in the integrated circuit. The executing includes the plurality of programmable pattern generator circuit blocks mimicking the memory access patterns of the plurality of kernels for each of the plurality of different floorplans. The method also includes generating, using the computer hardware, one or more design constraints based on a selected floorplan. The selected floorplan is selected from the plurality of different floorplans based on one or more performance metrics determined from the executing.

In one or more example implementations, a system includes a processor configured to initiate operations. The operations include determining memory access patterns of a plurality of kernels of a circuit design for implementation in an integrated circuit. The operations include generating a plurality of different floorplans. Each floorplan specifies a mapping of memory interfaces of the plurality of kernels to memories of the integrated circuit and an allocation of the plurality of kernels to a plurality of programmable pattern generator circuit blocks of a circuit architecture implemented in the integrated circuit. The operations include initiating execution of the plurality of different floorplans using the circuit architecture in the integrated circuit. The plurality of programmable pattern generator circuit blocks mimic the memory access patterns of the plurality of kernels for each of the plurality of different floorplans during execution of the respective plurality of different floorplans. The operations also include generating one or more design constraints based on a selected floorplan. The selected floorplan is selected from the plurality of different floorplans based on one or more performance metrics determined from the execution.

In one or more example implementations, a computer program product includes one or more computer readable storage media, and program instructions collectively stored on the one or more computer readable storage media. The program instructions are executable by computer hardware to initiate operations. The operations can include determining memory access patterns of a plurality of kernels of a circuit design for implementation in an integrated circuit. The operations include generating a plurality of different floorplans. Each floorplan specifies a mapping of memory interfaces of the plurality of kernels to memories of the integrated circuit and an allocation of the plurality of kernels to a plurality of programmable pattern generator circuit blocks of a circuit architecture implemented in the integrated circuit. The operations include initiating execution of the plurality of different floorplans using the circuit architecture in the integrated circuit. The plurality of programmable pattern generator circuit blocks mimic the memory access patterns of the plurality of kernels for each of the plurality of different floorplans during execution of the respective plurality of different floorplans. The operations also include generating one or more design constraints based on a selected floorplan. The selected floorplan is selected from the plurality of different floorplans based on one or more performance metrics determined from the execution.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

Figure 1:
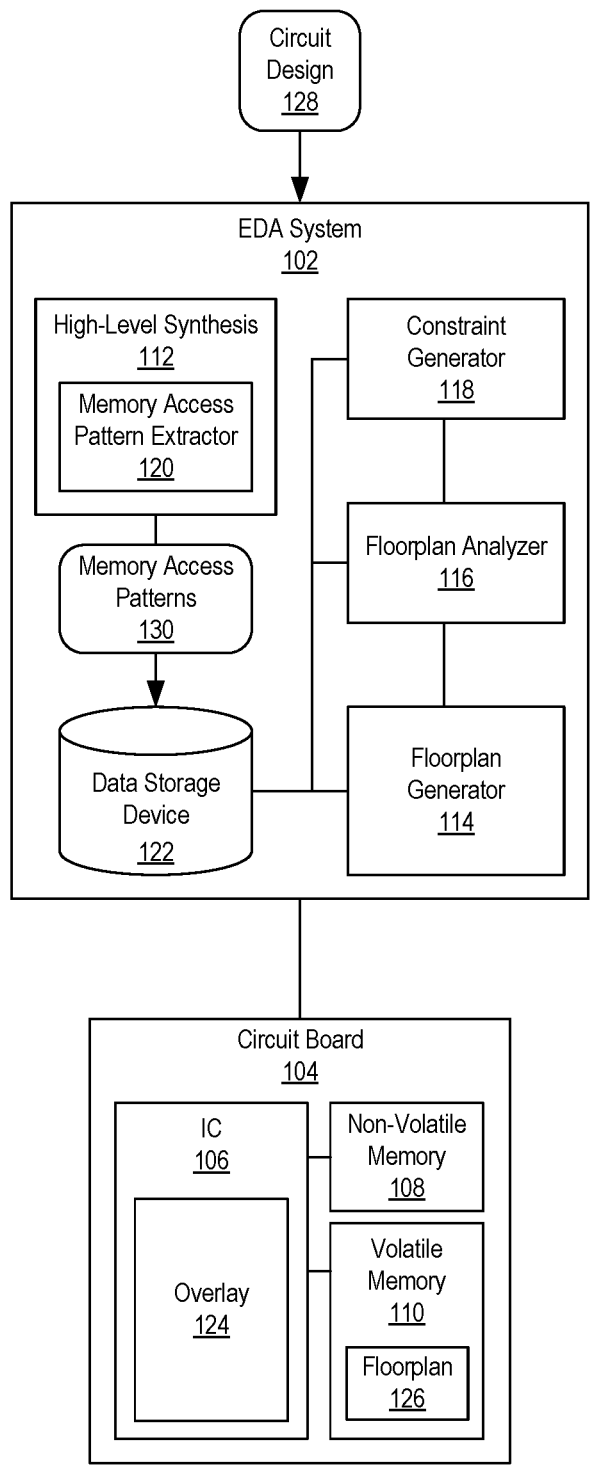
FIG. 1 illustrates an example computing environment including an Electronic Design Automation system and a circuit board having an IC.

This disclosure relates to integrated circuits (ICs). More particularly, this disclosure relates to predicting performance of multi-kernel circuit designs and determining suitable floorplans for multi-kernel circuit designs for implementation in ICs based on the predicted performance. In creating a multi-kernel circuit design for implementation in a selected IC, a user must map each of the memory interfaces of the kernels of the circuit design to particular memories of the IC. These memories may include memories implemented on the IC and/or memories that, while external to the IC, may be accessed by the IC. In order to achieve a mapping of memory interfaces to memories that supports the level of memory bandwidth needed by the circuit design to operate with the desired performance (e.g., predetermined design requirements), one must possess a knowledge of circuit design and the circuit architecture of the particular IC in which the circuit design is to be implemented (e.g., the "target IC"). In many cases, software developers that create kernels and multi-kernel circuit designs using High Level Synthesis, lack the requisite expertise to perform these operations.

Even in cases where a user does have sufficient expertise, the viability and performance of a given multi-kernel circuit design for a given target IC may not be known until that multi-kernel circuit design is physically implemented and tested in the target IC. This means that the implementation tools must perform a design flow (e.g., High-Level Synthesis, synthesis, placement, and routing) so that the multi-kernel circuit design may be implemented in the target IC and tested. Unfortunately, performing a design flow often requires hours to complete, sometimes exceeding 12 or even 24 hours of computer runtime. Once implemented in the target IC, analysis is performed to ensure that the multi-kernel circuit design is performing as expected. Each iteration of the circuit design must go through this process. In consequence, even for an experienced user to design and verify a multi-kernel circuit design, the multiple iterations often required may take days or weeks to complete.

In accordance with the inventive arrangements described within this disclosure, the performance of a multi-kernel circuit design may be predicted without having to undertake a design flow and/or physically implement the multi-kernel circuit design within the target IC. Using the inventive arrangements described within this disclosure, the performance of different implementations of a multi-kernel circuit design may be predicted. Each different implementation of the multi-kernel circuit design may correspond to a particular mapping of memory interfaces of a plurality of kernels of the multi-kernel circuit design to memories of the target IC. Each different implementation of the multi-kernel circuit design may also specify different locations or placements of the plurality of kernels in the target IC.

These different implementations, referred to herein as floorplans, may be realized as program code that programs a circuit architecture implemented in the target IC. The circuit architecture is specified by, or implemented by, a predetermined circuit design referred to as an "overlay." The overlay may be specific to the architecture of the particular target IC that is selected. Thus, rather generating different implementations of the multi-kernel circuit design and processing each through a design flow (e.g., High-Level Synthesis, synthesis, placement, and routing), one need only generate the different floorplans (e.g., program code). The generated floorplans may be loaded into the target IC with the overlay already having been implemented therein. Each different floorplan programs the overlay (e.g., the circuit architecture implemented by the overlay in the target IC) and is executed so that the circuit architecture mimics the memory access patterns of the multi-kernel circuit design for a given implementation.

For each different floorplan that is generated, the floorplan is loaded into the target IC and executed by the circuit architecture implemented by the overlay. For each floorplan, one or more performance metrics may be determined by way of executing the floorplans. A particular floorplan may be selected from those that were generated and tested based on a comparison of the performance metrics of the respective floorplans. The selected floorplan may be used as a basis for generating one or more design constraints that may be incorporated into, or used to implement, the multi-kernel circuit design. For example, the design constraints that are generated may be used by an Electronic Design Automation (EDA) system that is processing the multi-kernel circuit design through a design flow. The constraints may specify information such as a mapping of memory interfaces of the plurality of kernels to particular memories of the target IC and/or a placement or location for one or more or all of the kernels of the multi-kernel circuit design on the target IC.

FIG. 1 illustrates an example computing environment including an EDA system 102 and a circuit board 104. EDA system 102 may be implemented as hardware (e.g., dedicated circuitry), software (e.g., processor executable program code), or a combination thereof. For example, EDA system 102 may be implemented as a data processing system executing suitable software. An example of a data processing system is described herein in connection with FIG. 11. In another example, EDA system 102 may be implemented, e.g., executed, by a processor and/or processor system that is embedded within the same IC in which the overlay described herein is loaded. In still another example, one or more selected functions performed by EDA system 102 may be implemented by a processor and/or processor system embedded in the same IC in which the overlay is loaded while the remaining functions are performed by a data processing system coupled to the IC as illustrated in FIG. 1.

In the example of FIG. 1, EDA system 102 is communicatively linked to circuit board 104 over a communication channel. In an example implementation, the communication channel is a communication bus such as, for example, a Peripheral Component Interconnect Express (PCIe) bus. It should be appreciated, however, that EDA system 102 may be communicatively linked to circuit board 104 via any of a variety of communication channels and that the inventive arrangements are not intended to be limited by the particular examples provided.

In an example implementation, circuit board 104 may be implemented as a "card" that may be inserted into an available bus slot of EDA system 102 or connected via another communication channel. In the example, circuit board 104 includes an IC 106 coupled to a non-volatile memory 108 and a volatile memory 110. Non-volatile memory 108 may be implemented as a flash memory and is capable of storing firmware for IC 106. In one aspect, the firmware may be loaded into IC 106 to boot IC 106. Volatile memory 110 may be implemented as a random-access memory (RAM). Non-volatile memory 108 and volatile memory 110 are illustrated as being external to IC 106. Non-volatile memory 108 and volatile memory 110 are examples of memories of IC 106. Notwithstanding, IC 106 may include internal volatile memory as well.

IC 106 may be implemented as any of a variety of different ICs. In one aspect, IC 106 may be implemented as a programmable IC. A programmable IC is an IC that includes at least some programmable circuitry. Programmable logic is an example of programmable circuitry. Examples of a programmable IC include, but are not limited to, a Field Programmable Gate Array (FPGA), a System-on-Chip (SoC), and/or an Adaptive Compute Acceleration Platform (ACAP). As an illustrative and non-limiting example, an SoC and/or an ACAP type of IC may include one or more different subsystems therein. Examples of subsystems that may be included in IC 106 may include, but are not limited to, programmable logic, a processor system having one or more processors and/or cores, a data processing (DP) array, a Network-on-Chip (NoC), one or more hardwired or "Application-Specific" circuit blocks, or any combination of one or more of the example subsystems listed.

In the example, an overlay 124 is loaded into IC 106. In one aspect, overlay 124 is loaded from non-volatile memory 108. In another aspect, overlay 124 is loaded from EDA system 102. As defined within this disclosure, the term "overlay" means a predetermined circuit design that is loaded into an IC, e.g., a programmable IC, to implement a circuit architecture therein. Overlay 124, for example, may be a fully placed and routed circuit design. In an example, overlay 124 may include configuration data such as a configuration bitstream. The circuit architecture created by loading overlay 124 into IC 106 is programmable by floorplan 126 to mimic the memory access patterns of a circuit design 128 that includes a plurality of kernels.

The circuit architecture implemented in IC 106 by overlay 124 includes a plurality of programmable pattern generator (PPG) circuit blocks. PPG circuit blocks are not intended to model or emulate the actual functionality or tasks performed by kernels. Rather, each PPG circuit block, or group of two or more PPG circuit blocks operating in coordination with one another, is programmed by a floorplan solely to mimic the memory access patterns of a selected kernel. In this regard, the actual data that is transferred by PPG circuit blocks is not functional data. The data that is transferred by PPG circuit blocks may be random data that conforms with the memory access pattern of the particular kernel that the PPG circuit is programmed to mimic.

EDA system 102 is capable of generating one or more floorplans such as floorplan 126 that may be loaded from EDA system 102 into volatile memory 110. A floorplan is program code that is executable by the circuit architecture implemented in IC 106 by overlay 124. The program code of each floorplan specifies a mapping of memory interfaces of the plurality of kernels of circuit design 128 to memories of IC 106. The floorplan may also specify an allocation (e.g., location or placement) of the plurality of kernels of circuit design 128 to the plurality of PPG circuit blocks of overlay 124 that are implemented in IC 106. The allocation assigns kernels to particular PPG circuit blocks or groups of two or more PPG circuit blocks.

In the example of FIG. 1, EDA system 102 may receive circuit design 128. Circuit design 128 may be a user circuit design that is a multi-kernel circuit design. That is, circuit design 128 includes a plurality of kernels. Each kernel may implement a particular task or function that is to be implemented in circuitry of IC 106. In the example, circuit design 128 may be specified in a high-level programming language (HLPL). One or more or all of the kernels of circuit design 128, for example, may be specified in an HLPL. In another example, circuit design 128 may be specified in a hardware description language (HDL). One or more or all of the kernels may be specified in an HDL.

As defined herein, the term "high-level programming language" or "HLPL" means a programming language, or set of instructions, used to program a data processing system where the instructions have a strong abstraction from the details of the data processing system, e.g., machine language. For example, a high-level programming language may automate or hide aspects of operation of the data processing system such as memory management. The amount of abstraction typically defines how "high-level" the programming language is. Using a high-level programming language frees the user from dealing with registers, memory addresses, and other low-level features of the data processing system upon which the high-level programming language will execute. In this regard, a high-level programming language may include little or no instructions that translate directly, on a one-to-one basis, into a native opcode of a central processing unit (CPU) or processor of a data processing system. Examples of high-level programming languages include, but are not limited to, C, C++, SystemC, OpenCL C, or the like.

As defined herein, the term "hardware description language" or "HDL" is a computer-language that facilitates the documentation, design, and manufacturing of a digital system, such as an IC. An HDL is expressed in human readable form and combines program verification techniques with expert system design methodologies. Using an HDL, for example, a user can design and specify an electronic circuit, describe the operation of the circuit, and create tests to verify operation of the circuit. An HDL includes standard, text-based expressions of the spatial and temporal structure and behavior of the electronic system being modeled. HDL syntax and semantics include explicit notations for expressing concurrency. In contrast to most high-level programming languages, an HDL also includes an explicit notion of time, e.g., clocks and/or clock signals, which is a primary attribute of a digital system. For example, an HDL design may describe the behavior of a circuit design as data transfers occur between registers each clock cycle. Examples of HDLs may include, but are not limited to, Verilog and VHDL. HDLs are sometimes referred to as register transfer level (RTL) descriptions of circuit designs and/or digital systems. Both Verilog and VHDL support the ability to specify attributes on modules in their native syntax.

In the example, EDA system 102 may include a high-level synthesis (HLS) block 112, a floorplan generator 114, a floorplan analyzer 116, and a constraint generator 118. HLS block 112 implements an automated and computer-based design process in which a description of desired behavior of an electronic system, e.g., circuit design 128, is converted into a circuit design that is ultimately realized in physical circuitry. The description of the desired behavior is typically written as an application in an HLPL. The application may be translated into a circuit design that may be specified in HDL. The HDL description describes a synchronous digital circuit in terms of the flow of digital signals between hardware registers and the operations performed on those signals.

In another aspect, circuit design 128 may be further processed through a design flow using one or more design constraints generated by constraint generator 118, where the design flow may perform operations such as synthesis, placement, and routing. The processed circuit design may be implemented within an IC such as IC 106. Performing a design flow, however, on circuit design 128 is not required for predicting performance and generating design constraints as described herein.

HLS block 112 includes a memory access pattern (MAP) extractor 120. MAP extractor 120 is capable of analyzing circuit design 128 to determine memory access patterns 130 of circuit design 128 and storing memory access patterns 130 in data storage device 122. MAP extractor 120 is capable of determining memory access patterns for each kernel that is included in circuit design 128. As defined within this disclosure, the term "memory access pattern" means a sequence of reads and/or writes of a kernel to a memory of a target IC in which the kernel is to be implemented. The memory access pattern specifies a size of each memory access (read or write) and timing of the memory accesses. In some cases, a memory access is referred to herein as a transfer or a data transfer. In this regard, a "memory access pattern" specifies memory reads and/or memory writes and the size of such memory accesses performed by a kernel over time. A memory access pattern, for example, may specify information such as whether a memory access of the memory access pattern is a read or a write, how many bytes are transferred for each memory access, how many cycles occur between memory accesses of the memory access pattern, and whether the memory accesses are sequential or random access. A memory access pattern indicates the dynamic nature of memory accesses of a kernel as opposed to a static analysis that does not contain timing information.

In one aspect, HLS block 112 and MAP extractor 120 are capable of determining memory access patterns 130 of the kernels of circuit design 128 by simulating the kernel(s) such as by using a test bench that may be provided with the respective kernels. In another aspect, HLS block 112 and MAP extractor 120 are capable of determining memory access patterns 130 of the kernels of circuit design 128 by evaluating the intermediate representation of the kernel that is generated by HLS 112 in transforming HLPL source code of circuit design 128 into HDL. As noted, HLS block 112 is capable of storing memory access patterns 130 for the kernels of circuit design 128 in data storage device 122.

As defined within this disclosure, the term "intermediate representation" is the code, specified as a data structure, used internally by a compiler or other program such as an HLS application to represent source code. A compiler translates HLPL source code into intermediate representation to perform further operations on the source code. An intermediate representation is designed to be conducive to further processing, such as optimization of source code and further translation of the source code into an executable or a hardware implementation. An intermediate representation is an accurate representation of the source code that is capable of representing the source code without loss of information and is independent of any particular source or target language. In some cases, the intermediate representation may use a static single assignment (SSA) compliant form. Examples of intermediate representations include, but are not limited to, stack machine code, two address code, three address code, and/or a graph data structure. Other examples of intermediate representations may include, but are not limited to Low Level Virtual Machine (LLVM) intermediate representation and GNU Compiler Collection (GCC) intermediate representation.

Floorplan generator 114 is capable of automatically generating one or more floorplans such as floorplan 126 based on memory access patterns 130 of kernels of circuit design 128. Each of the floorplans is executable by the circuit architecture implemented by overlay 124. Each floorplan further represents, e.g., is capable of mimicking, a particular implementation of circuit design 128. In an example, floorplan generator 114 may store a floorplan such as floorplan 126 in volatile memory 110 for execution by the circuit architecture of overlay 124.

In one aspect, in generating floorplans, floorplan generator 114 may receive information that specifies one or more instantiation constraints. The instantiation constraints specify how many times each kernel of circuit design 128 is to be instantiated in the target IC. The instantiation constraints may be included in circuit design 128 or provided from a user as input. The floorplans generated by floorplan generator 114 conform to the specified instantiation constraints by including the number of instances of each of the kernels of circuit design 128 as specified by the instantiation constraints. The encoded memory access patterns in combination with mappings of memory interfaces of kernels to memories of IC 106 form a program or set of instructions, e.g., the floorplan, that PPG circuit blocks of overlay 124 are capable of interpreting (e.g., executing).

Floorplan analyzer 116 is capable of communicating with IC 106 and obtaining one or more performance metrics relating to execution of the various floorplans executed by the circuit architecture implemented in IC 106 by overlay 124 over time. Floorplan analyzer 116 may store the performance metrics for the different overlays in data storage device 122. In one or more example implementations, floorplan analyzer 116 is capable of tracking the number of executions performed for each floorplan and the number of floorplans that have been generated and executed over time.

Floorplan analyzer 116 is capable of selecting a particular floorplan of the various floorplans generated and executed by IC 106. Floorplan analyzer 116 is capable of selecting the floorplan providing the highest level of performance as determined using the one or more performance metrics, e.g., using a particular performance metric or using a function of the one or more performance metrics, determined from executing the respective floorplans.

Constraint generator 118 is capable of generating one or more design constraints based on the floorplan selected by floorplan analyzer 116. Constraint generator 118 is capable of storing the generated design constraint(s) within data storage device 122. The generated design constraint(s) may be used in performing a design flow on circuit design 128. The generated design constraint(s) ensure that the implementation of circuit design 128 generated by the design flow uses or specifies the same or similar properties as the selected floorplan. For example, constraint generator 118 may generate design constraints that correspond to, or cause the design flow to implement, the particular mapping of memory interfaces of the kernels to memories of IC 106 and/or the particular placement or location of kernels on IC 106 that was used to mimic memory access patterns by the selected floorplan.

In the example of FIG. 1, the iterative process described may be performed in substantially less time than processing multiple different implementations of circuit design 128 (e.g., where each implementation has a different mapping of memory interfaces of kernels to memories of IC 106 and/or different placement of kernels) through design flows. Such is the case since floorplans may be generated without ever having to process circuit design 128 through a single design flow. Rather, programming data is generated based on the memory access patterns of the kernels of circuit design 128 and the mapping information and/or placement of kernels.

In one aspect, floorplan generator 114 is capable of generating floorplans using any of a variety of different techniques. For example, floorplan generator 114 may generate floorplans using a simulated annealing technique, using a biologically based repetitive mutation and evaluation technique (e.g., Covariance Matrix Adaptation Evolution Strategy or "CMA-ES"), or using another available technique. In another example, floorplan generator 114 may generate floorplans using a reinforced learning-based approach where a neural agent is configured to modify the mapping of kernel memory interfaces and/or placement of kernels and observe the effect of the modifications. The neural agent may, for example, learn a mapping and/or placement policy in the process.

Figure 2:
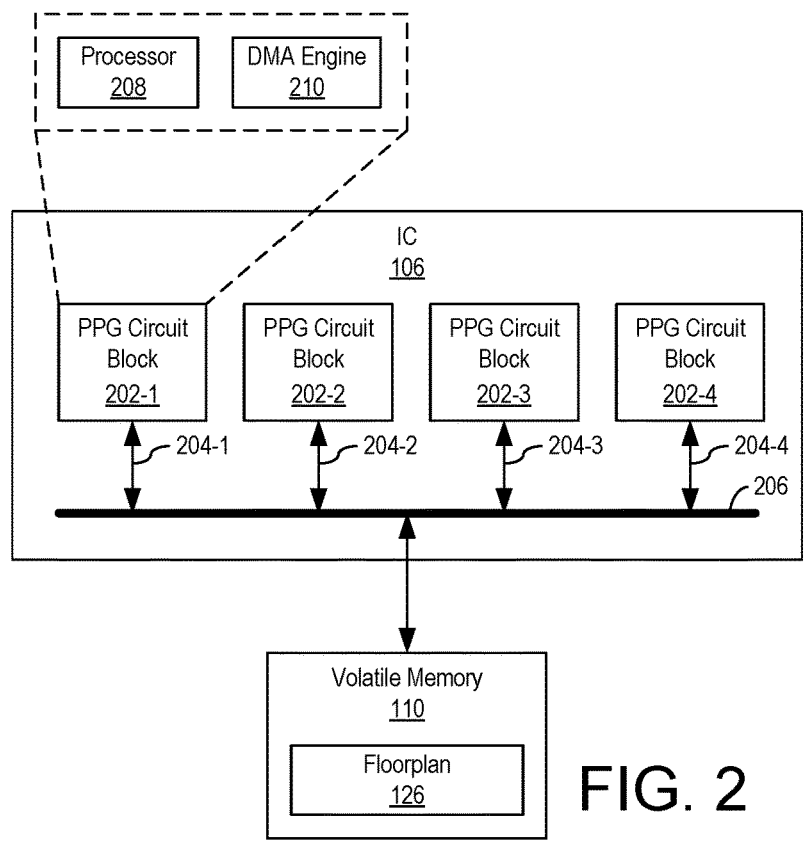
FIG. 2 is an example of the circuit architecture implemented in an IC by an overlay.

FIG. 2 is an example circuit architecture implemented in IC 106 by overlay 124. In the example of FIG. 2, the circuit architecture includes a plurality of PPG circuit blocks 202-1, 202-2, 202-3, and 202-4. The circuit architecture may include fewer or more PPG circuit blocks 202 than illustrated in the example. In the example, each PPG circuit block 202 includes an interface 204 that communicatively links the PPG circuit block 202 to an interconnect 206.

In one aspect, each PPG circuit block 202 may include a processor 208 that is capable of executing memory access patterns of a floorplan by issuing commands to a Direct Memory Access (DMA) engine 210. PPG circuit blocks 202 may also include one or more timers (not shown) that may be used to time the various memory accesses of a memory access pattern. Processor 208 and/or DMA engine 210 may be implemented using the programmable logic of IC 106. In this regard, one or more or each of PPGs 202 is capable of executing program code from floorplan 126 to mimic the data access patterns of a selected kernel of circuit design 128.

In one or more other example implementations, particular types of PPG circuit blocks may be available that utilize a hardwired processor and a hardwired DMA engine. An example of such a PPG circuit block is a DP array PPG circuit block described in connection with FIGS. 7A, 7B, and 10.

Interconnect 206 may be implemented as on-chip interconnect. An example of an on-chip interconnect is an AMBA eXtensible Interface (AXI) bus. An AXI bus is an embedded microcontroller bus interface for use in establishing on-chip connections between circuit blocks and/or systems. Other example implementations of interconnect circuitry may include, but are not limited to, other buses, cross-bars, network on chips (NoCs), and so forth. It should be appreciated that AXI is provided for purposes of illustration and is not intended as a limitation of the inventive arrangements described herein. In the example of FIG. 2, the interfaces 204 may be implemented as memory-mapped interfaces (e.g., AXI memory-mapped interfaces).

In one aspect, a host processor, whether a data processing system or an embedded processor, is capable of writing an appropriate data structure (e.g., floorplan) into a memory such as volatile memory 110 or an internal memory of IC 106 (e.g., a block RAM) that is accessible to both the host processor and the PPG circuit blocks 202. The PPG circuit blocks 202 may then read the memory and interpret, or execute, the floorplan upon initialization. PPG circuit blocks 202, in executing the floorplan, are capable of performing operations such as waiting for a designated number of cycles, reading set amounts of data from particular addresses, and/or writing set amounts of data to particular addresses.

In the example of FIG. 2, each PPG circuit block 202 includes a predetermined number of interfaces. For example, each PPG circuit block 202 may include one memory mapped interface (e.g., interface 204). Thus, in cases where a kernel requires more than the number of interfaces provided by a PPG circuit block 202, two or more such PPG circuit blocks 202 may operate in a coordinated manner to mimic the memory access patterns of a single kernel allocated thereto.

It should be appreciated that the particular circuit architecture implemented by overlay 124 may be specific to the target IC. That is, the target IC may include programmable circuitry, one or more hardwired circuit blocks, or some combination thereof. The circuit architecture implemented by overlay 124 may utilize the available circuit structures of the target IC. For example, if the target IC includes programmable circuitry, the programmable circuitry may be used to implement PPG circuit blocks 202 and interconnect 206. In another example, interconnect 206 may be implemented as hardwired circuitry while PPG circuit blocks 202 are implemented using programmable circuitry. In another example, interconnect 206 may be implemented using programmable circuitry while PPG circuit blocks 202 are implemented using hardwired circuit blocks. In still another example, PPG circuit blocks 202 and interconnect 206 may be implemented has hardwired circuit blocks that are programmable.

Figure 3:
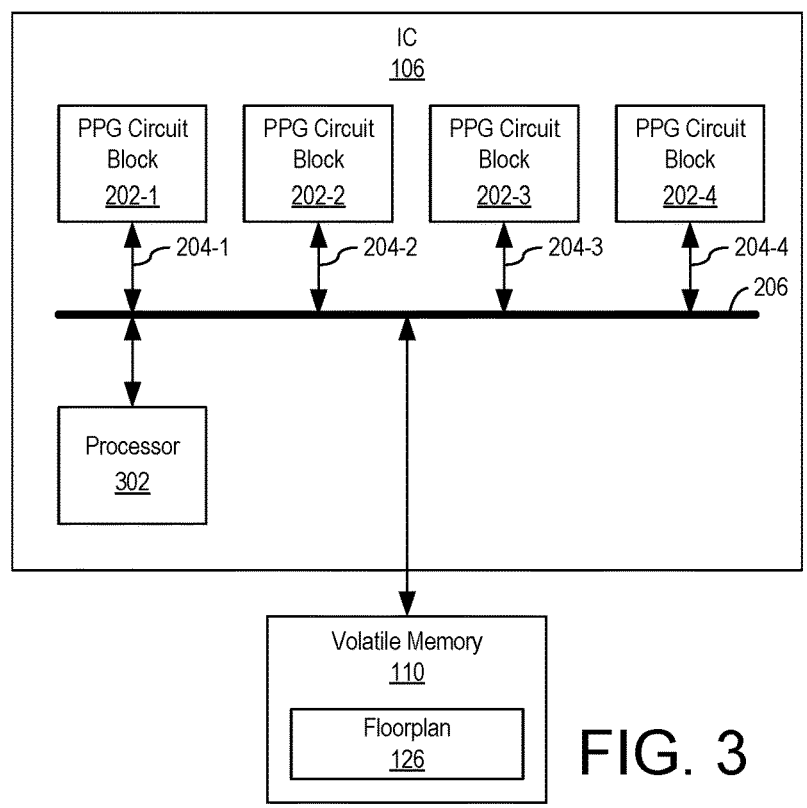
FIG. 3 is another example circuit architecture implemented in an IC by an overlay.

FIG. 3 is another example circuit architecture implemented in IC 106 by overlay 124. In the example of FIG. 3, the circuit architecture also includes a processor 302 or processor system including a plurality of processors and/or processor cores as described in greater detail hereinbelow and in connection with FIG. 10. In the example of FIG. 3, processor 302 may implement one or more or all of the functions described in connection with EDA system 102 of FIG. 1. That is, one or more or all of the functions attributed to EDA system 102 of FIG. 1 may be performed by processor 302 embedded in the same IC 106 in which the circuit architecture implemented by overlay 124 is implemented.

In the example of FIG. 3, processor 302 may be implemented in programmable logic or implemented as a hardwired circuit block. In one or more example implementations, overlay 124 may include the configuration data that forms processor 302 in programmable logic, the configuration data that configures a hardwired version of processor 302, and/or the program code executed by processor 302.

Figure 4:
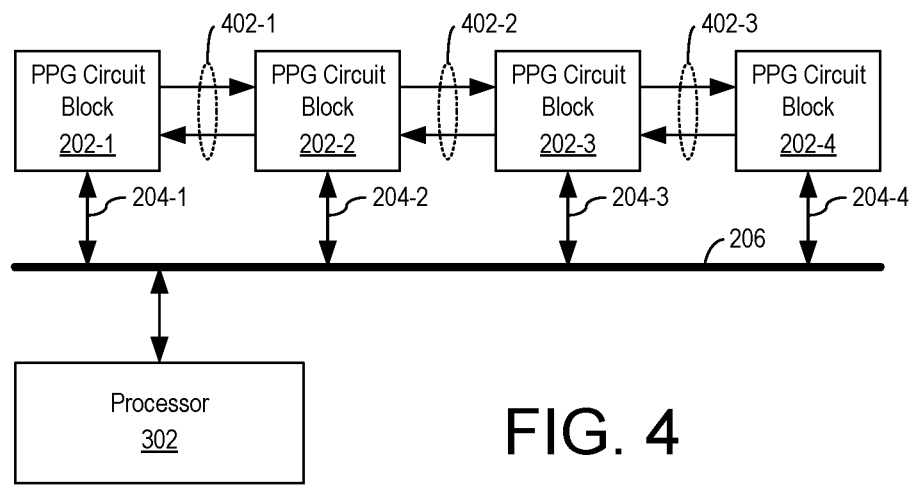
FIG. 4 is another example circuit architecture implemented in an IC by an overlay.

FIG. 4 is another example circuit architecture implemented in IC 106 by overlay 124. In the example of FIG. 4, the circuit architecture implements stream interfaces 402-1, 402-2, and 402-3 between the respective PPG circuit blocks 202 facilitating direct communications among the various circuit blocks. Each of stream interfaces 402 may include an incoming stream channel and an outgoing stream channel over which data may be conveyed from one PPG circuit block 202 to the next. Implementation of the communication links between PPG circuit blocks 202 facilitates communication among the PPG circuit blocks 202. In the example of FIG. 4, processor 302 may be included as described in connection with FIG. 3. In other example implementations, processor 302 may be omitted.

For example, stream interfaces 402 allow PPG circuit blocks 202 to synchronize operation with one another. The programming of a floorplan may implement the memory access patterns of the various kernels being mimicked. The memory access patterns may include dependencies among the different kernels. For example, PPG circuit block 202-2 be programmed to initiate a memory access only in response to a different memory access performed by PPG circuit block 202-1 being initiated or completed. In that case, PPG circuit block 202-1 may not initiate the memory access until a notification is received from PPG circuit block 202-1 via stream interface 402-1 that the memory access has been initiated or completed as the case may be. Thus, stream interfaces 402 are capable of conveying signaling among PPG circuit blocks 202 to synchronize operation thereof per the programming of the respective PPG circuit blocks 202 specified in the floorplan that is executed.

Figure 5:
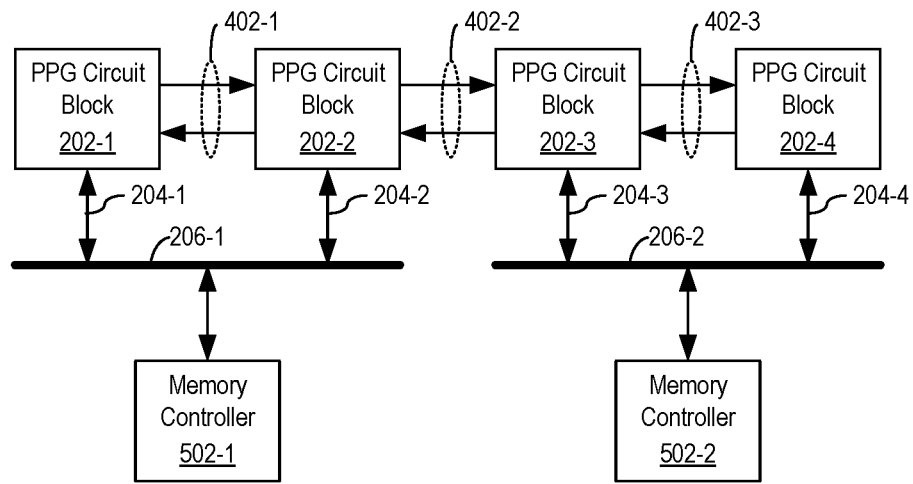
FIG. 5 is another example circuit architecture implemented in an IC by an overlay.

FIG. 5 is another example circuit architecture implemented in IC 106 by overlay 124. In the example of FIG. 5, the circuit architecture implements multiple interconnects 206-1 and 206-2, where each is coupled to a different memory controller 502. Interconnect 206-1 is coupled to memory controller 502-1. Interconnect 206-2 is coupled to memory controller 502-2. In one or more example implementations, memory controllers 502 may be implemented using programmable logic in IC 106. In one or more other example implementations, memory controllers 502 may be implemented as hardwired circuit blocks within IC 106.

Figure 6:
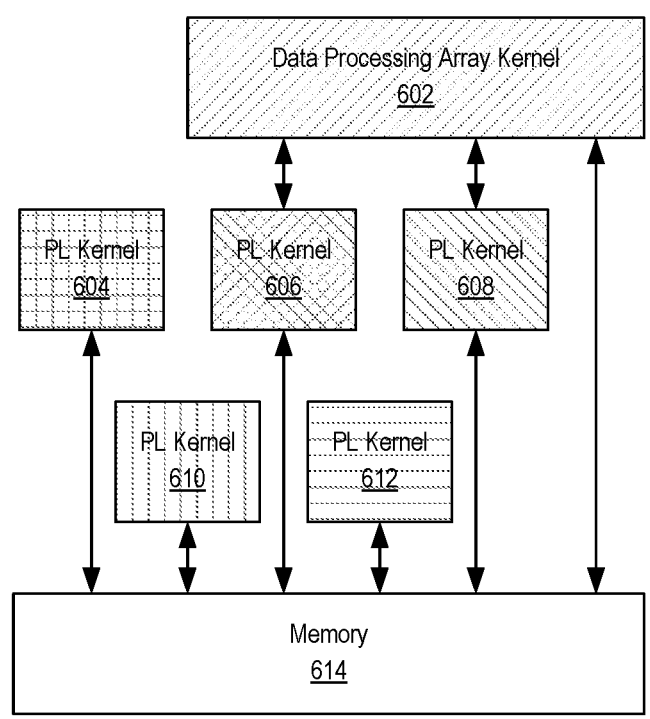
FIG. 6 illustrates an example kernel structure of a circuit design that may be mapped onto a circuit architecture implemented by an overlay.

FIG. 6 illustrates an example kernel structure of circuit design 128 that may be executed as a floorplan by the circuit architecture implemented by an overlay. In the example of FIG. 6, circuit design 128 includes a plurality of different types of kernels. For example, circuit design 128 includes a data processing (DP) array kernel 602, and programmable logic (PL) kernels 604, 606, 608, 610, and 612. DP array kernel 602 refers to a kernel that is to be implemented using a data processing engine (e.g., a compute unit) of a DP array in IC 106. PL kernels refer to kernels that are to be implemented in programmable logic of IC 106.

Each of the kernels includes interfaces to other kernels and/or to memory 614 as shown. Memory 614 may be implemented as a volatile memory. For example, memory 614 may be implemented as a double data rate (DDR) RAM or as a High-Bandwidth Memory (HBM). In one aspect, memory 614 may be external to IC 106 (e.g., volatile memory 110). In another example, memory 614 may be implemented within the same package as IC 106. In that case, memory 614 may be implemented on the same die used to implement overlay 124 or in a different die coupled to the die used to implement overlay 124.

Figure 7A:
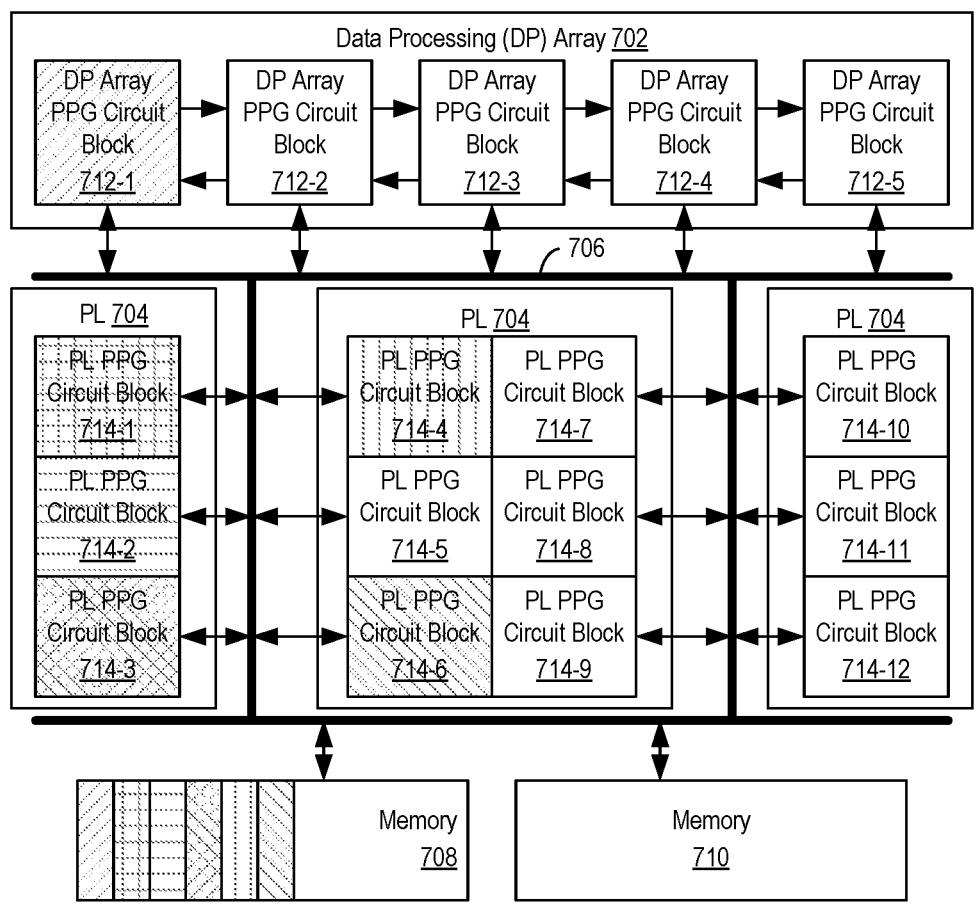
FIGS. 7A and 7B are examples of a circuit architecture implemented by an overlay executing different floorplans.
Figure 7B:
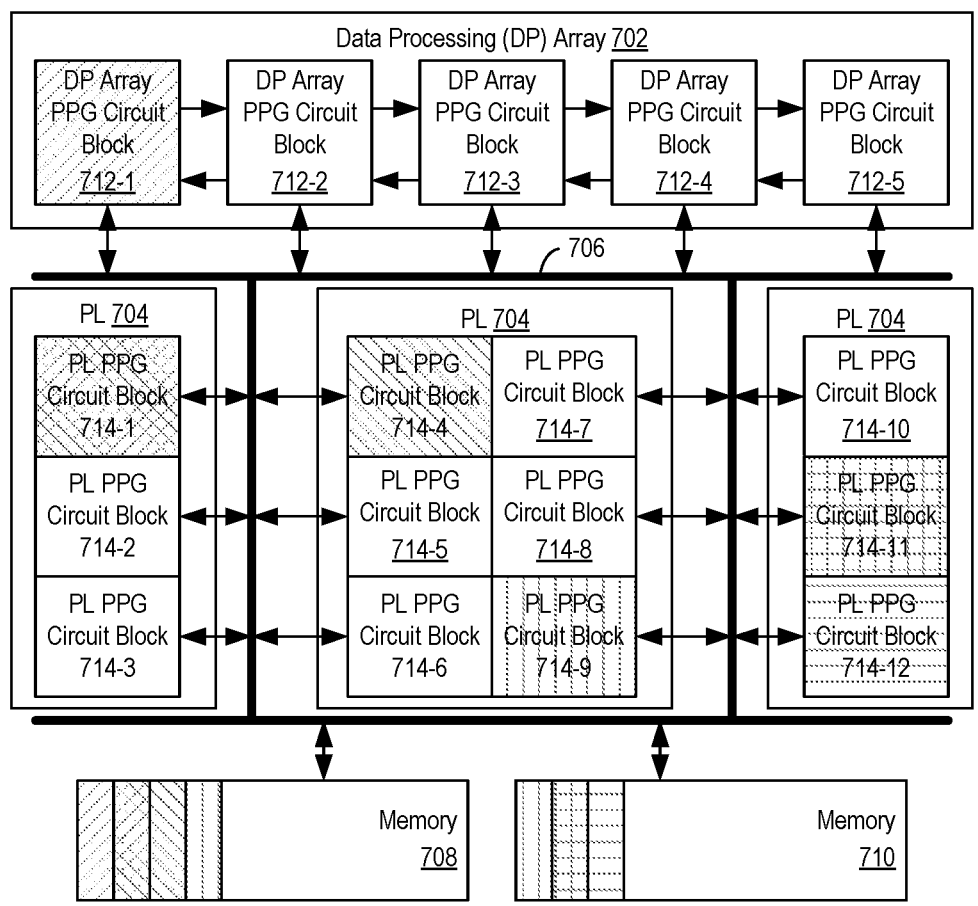

FIGS. 7A and 7B illustrate an example circuit architecture implemented in IC 106 by overlay 124 executing different floorplans. In the examples of FIGS. 7A and 7B, IC 106 includes a variety of different subsystems including a DP array 702, PL 704, and a NoC 706. IC 106 may include one or more HBMs and/or be coupled to one or more RAMs external to the IC, represented in FIGS. 7A and 7B as memories 708, 710. DP array 702 includes a plurality of hardwired and programmable data processing engines. An example implementation of DP array 702, PL 704, and NoC 706 is described in connection with FIG. 10.

In the example of FIG. 7A, IC 106 includes various hardwired circuit structures that are configured by loading overlay 124. Overlay 124 implements a plurality of DP array PPG circuit blocks 712-1, 712-2, 712-3, 712-4, and 712-5 in DP array 702. Overlay 124 implements a plurality of PL PPG circuit blocks 714-1, 714-2, 714-3, 714-4, 714-5, 714-6, 714-7, 714-8, 714-9, 714-10, 714-11, and 714-12 in PL 704. In the example, NoC 706 includes fixed or hardwired attachment points to which DP PPG circuit blocks 712 and PL PPG circuit blocks 714 connect.

A floorplan may be executed by the circuit architecture implemented by overlay 124. For purposes of illustration, consider an example where a floorplan is generated for the example kernel architecture of FIG. 6. The floorplan maps, or assigns, the kernels to different PPG circuit blocks. Like kernels are mapped to like blocks. That is, DP array kernels are assigned to DP array PPG circuit blocks while PL kernels are assigned to PL PPG circuit blocks. Further, the floorplan dictates which of memories 708, 710 each of the kernels will use. The floorplan executed by the circuit architecture in the example of FIG. 7A maps DP array kernel 602 to DP array PPG circuit block 712-1; PL kernel 604 to PL PPG circuit block 714-1; PL kernel 606 to PL PPG circuit block 714-3; PL kernel 608 to PL PPG circuit block 714-6; PL kernel 610 to PL PPG circuit block 714-4; and PL kernel 612 to PL PPG circuit block 714-2. In the example, the buffer for each kernel is placed or located in memory 708.

In this example, each of kernels 604-612 accesses the same memory through the same memory controller, which may lead to congestion and a slow-down in performance of circuit design 128. Further, nearly all of the data of the memory access patterns flows through the left vertical leg of NoC 706.

In the examples described within this disclosure, the mapping of a memory interface to a particular memory is equivalent to assigning a buffer of the kernel to a particular memory as such an assignment dictates the particular path through the circuit architecture of overlay 124 data for memory access patterns will traverse. Further, it should be appreciated that a kernel is mapped to a particular PPG circuit block by programming that PPG circuit block, via the floorplan, to mimic the memory access patterns of the kernel assigned thereto.

FIG. 7B illustrates execution of another floorplan using the circuit architecture of FIG. 7A as implemented in IC 106 by overlay 124. In the example of FIG. 7B, the floorplan executed by the circuit architecture maps DP array kernel 602 to DP array PPG circuit block 712-1; PL kernel 604 to PL PPG circuit block 714-11; PL kernel 606 to PL PPG circuit block 714-1; PL kernel 608 to PL PPG circuit block 714-4; PL kernel 610 to PL PPG circuit block 714-9; and PL kernel 612 to PL PPG circuit block 714-12. In the example, the buffers are moved such that the buffer for DP array kernel 602, PL kernel 606, PL kernel 608, and PL kernel 610 are located in memory 708. The buffers for PL kernel 610, PL kernel 604, and PL kernel 612 are located in memory 710. In the example of FIG. 7B, the buffer for PL kernel 610 is spread over both memories 708, 710.

The floorplan of FIG. 7B spreads the location of the kernels throughout PL 704 such that memory accesses are more evenly distributed over different portions of IC 106 and, more particularly, more evenly spread over NoC 706 and the memory controllers for accessing memories 708, 710. For example, each of memories 708, 710 may be controlled by a dedicated memory controller (not shown) that is implemented in IC 106.

In one or more aspects, the allocation of kernels to particular memories (e.g., memory interfaces of kernels to particular memories) may be performed based on the timing of the memory access patterns. For example, the memory interfaces of two kernels may be assigned to the same memory (e.g., the buffer of each kernel accessed by the memory interface of the respective kernels may be placed in a same physical memory) particularly in cases where the memory accesses of the kernels do not overlap in time. Such a floorplan will exhibit higher performance metrics in that the floorplan, when executed, will exhibit higher memory bandwidth, where memory bandwidth or "memory throughput" is an example performance metric. Memory bandwidth is the rate at which data may be read from memory and/or written to memory.

Similarly, a kernel with a memory access pattern characterized by random, short, memory accesses will often saturate or overload a memory subsystem (e.g., interconnect and/or memory controller). A kernel with a memory access pattern characterized by fewer memory accesses that are larger in size does not often saturate or overload a memory subsystem. In this regard, a floorplan that maps kernels of the former type (random, short, memory accesses) and assigns buffers so that the kernels do not share portions of the memory subsystem used by the kernels with portions of the memory subsystem used by kernels of the latter type (fewer, larger memory accesses) may provide higher performance metrics than those that do not. For example, PL kernel 606 assigned to PL PPG circuit block 714-1 may perform random, short memory accesses while PL kernel 604 assigned to PL PPG circuit block 714-11 may perform fewer, larger memory accesses. As shown, each accesses a different portion (e.g., leg) of NoC 706 and a different memory.

Similarly, a floorplan that maps kernels of the latter type (fewer, larger memory accesses) and assigns buffers so that the kernels do share the memory subsystem or at least the portions used by the kernels with other kernels of the same type (e.g., fewer, larger memory accesses) may provide higher performance metrics than floorplans that do not. For example, PL kernel 604 assigned to PL PPG circuit block 714-11 and PL kernel 612 assigned to PL PPG circuit block 714-12 each may perform fewer, larger memory accesses. As shown, both of these kernels access the same portion of NoC 706 (e.g., the right leg) and the same memory (e.g., memory 710).

In the example of FIGS. 7A and 7B, the circuit architecture implemented by overlay 124 utilizes one or more hardwired circuit structures such as DP array 702 and NoC 706. In the example, NoC 706 includes fixed or static attachment points. Thus, the placement (e.g., location) of a DP array kernel to a particular DPA PPG circuit block 712 and/or a PL kernel to a particular PL PPG circuit block 714 approximates placement of the actual kernel to the location on IC 106 at which the assigned PPG circuit block is located and may be translated into location or placement design constraints for circuit design 128. Similarly, the location of buffers of the kernels to particular memories may be translated into design constraints that dictate the particular memory in which buffers for respective kernels of the circuit design are to be implemented.

In other arrangements, the interconnect(s) may be implemented in programmable logic while the memory controllers are hardwired. In still other arrangements, the interconnect (s) and the memory controllers may be implemented using programmable logic. In either case, the overlay implements the circuit architecture including the PPG circuit blocks in the available subsystems of the IC. Once implemented, the circuit architecture specified by an overlay may remain constant or static while different floorplans are generated and executed. Whether the circuit architecture of an overlay is implemented using programmable logic, hardwired circuit blocks, or a combination thereof, the assignment of kernels to particular PPG circuit blocks may be approximated using design (e.g., placement) constraints.

In one or more of the example implementations described within this disclosure, the overlay may include circuitry that is capable of measuring performance of the floorplan when executed. That is, the circuit architecture may include circuitry capable of calculating the memory bandwidth achieved by the floorplan (e.g., quantify the amount of data that may be moved through the memory subsystem of the circuit architecture). A same or similar process may be performed in such other circuit architectures, e.g., assigning kernels to different PPG circuit blocks and assigning memory interfaces of kernels to particular memories, as described in connection with FIGS. 7A and 7B regardless of whether the circuit architecture utilizes entirely programmable logic and/or a mixture of programmable logic and hardwired circuit blocks. In the case where a PPG circuit block includes a processor and/or is implemented using a processor, the processor may be programmed to monitor and track memory bandwidth achieved by the kernel being mimicked by the PPG circuit block over time. This data may be output or read out of IC 106 and provided to EDA system 102 for analysis and/or evaluation.

Figure 8:
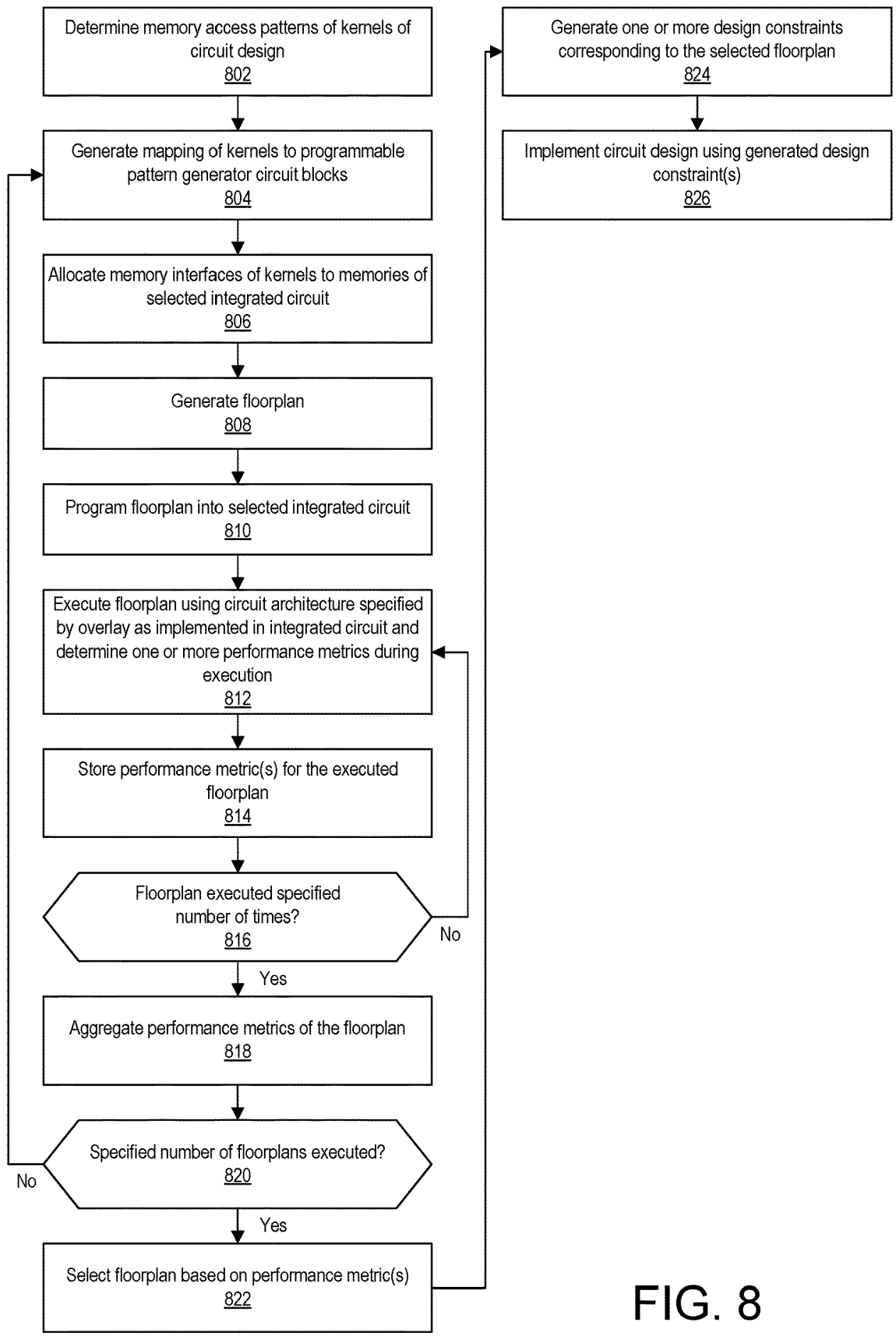
FIG. 8 is an example method illustrating certain operative features of the inventive arrangements described within this disclosure.

FIG. 8 is an example method 800 illustrating certain operative features of the inventive arrangements described within this disclosure. In block 802, MAP extractor 120 is capable of determining memory access patterns of kernels of circuit design 128. In block 804, floorplan generator 114 is capable of generating a mapping of kernels to PPG circuit blocks of an overlay that may be implemented in IC 106. In block 806, floorplan generator 114 is capable of allocating memory interfaces of the kernels to memories of IC 106 (e.g., the target IC). That is, floorplan generator 114 is capable of assigning buffers of the respective kernels to memories of IC 106.

In block 808, floorplan generator 114 is capable of generating a floorplan that implements the mapping of kernels and memory interface allocations of blocks 804 and 806. In block 808, floorplan generator 114, for example, is capable of generating the program code for the different PPG circuit blocks of the overlay that cause each of the PPG circuit blocks to mimic the memory access patterns of the kernel(s) assigned thereto and access the particular memories for the kernel(s).

In block 810, EDA system 102 programs the floorplan into memory accessible by the circuit architecture implemented in IC 106 by overlay 124. For example, floorplan generator 114 is capable of writing the generated floorplan to volatile memory 110 and/or to an internal memory of IC 106. In block 812, the floorplan is executed using the circuit architecture implemented in IC 106 by overlay 124. During execution, one or more performance metrics are calculated. Example performance metrics that may be determined can include, but are not limited to, total runtime, memory bandwidth, jitter (e.g., variability of runtime and/or memory bandwidth) which may be helpful for real-time applications, and/or latency.

In one aspect, performance metrics may be calculated by processors 208 of the respective PPG circuit block(s) implemented in IC 106. The processors, for example, are capable of setting up and starting a timer that may be interrogated to determine elapsed time and to calculate memory bandwidth and/or other ones of the performance metrics described. In another aspect, one or more performance monitor circuits may be included in the overlay and implemented in IC 106. The performance monitor circuits couple to the various interconnects and/or buses implemented in IC 106. The performance monitor circuits are capable of monitoring and detecting data traffic on the various interconnects to perform measurements and generate one or more or all of the performance metrics described. In the case of using performance monitor circuits, processors 208 of the respective PPG circuit block(s) are capable of communicating with the performance monitor circuits to determine or read the generated performance metrics. In still another aspect, a combination of using processor(s) 208 and/or performance monitor circuits may be used.

In block 814, the performance metric(s) for the executed floorplan may be stored. For example, floorplan analyzer 116 may read the performance metric(s) from IC 106 and store the performance metrics in association with the particular floorplan that was executed in data storage device 122.

In block 816, floorplan analyzer 116 may determine whether the floorplan was executed a specified number of times. The number of times that a given floorplan may be executed by may be specified, for example, as a user-specifiable parameter for floorplan analyzer 116. Performance metric(s) may be generated and stored on a per floorplan basis and also on a per floorplan iteration or execution basis. In response to determining that the floorplan was executed the specified number of times, method 800 continues to block 818. In response to determining that the floorplan was not executed the specified number of times (e.g., fewer than the specified number of times), method 800 may loop back to block 812 to execute the floorplan again. For example, EDA system 102 may restart execution of the floorplan.

In block 818, floorplan analyzer 116 is capable of aggregating the performance metric(s) from the different executions of the floorplan. For example, floorplan analyzer 116 may calculate an average for each of the performance metric(s) across the different executions of the floorplan and store the resulting average performance metric(s) in data storage device 122. In other examples, floorplan analyzer 116 may perform aggregation by calculating a minimum, a maximum, an average, a median, and/or one or more quantiles for the different performance metrics that were determined.

In block 820, floorplan analyzer 116 determines whether a specified number of floorplans have been executed. The number of floorplans to be executed may be a default parameter or may be overridden as a user-preference. The number of floorplans to be executed is the number of different floorplans that are generated by floorplan generator 114 and executed in IC 106 over time. In response to determining that the specified number of floorplans have been executed, method 800 may continue to block 822. In response to determining that the specified number of floorplans have not yet been executed, method 800 may loop back to block 804 to generate a further floorplan for execution. In one aspect, floorplan analyzer 116 may communicate with floorplan generator 114 to instruct floorplan generator 114 to generate another floorplan and provide the floorplan to IC 106.

In block 822, floorplan analyzer 116 is capable of selecting a particular floorplan from those that have been generated and executed based on the performance metric(s) of the respective floorplans. In one aspect, floorplan analyzer 116 may select a particular floorplan that has the best performance metric (e.g., once aggregated across executions) or use a function of the various performance metrics of the floorplans post aggregation.

In an example implementation, floorplan analyzer 116 is capable of selecting the floorplan having a highest average performance as determined by one or more of the aggregated performance metrics. In another example implementation, floorplan analyzer 116 is capable of selecting a floorplan with a highest average performance as determined by one or more of the aggregated performance metrics with a specified percentile execution duration (e.g., 95th or other specified percentile execution) that is below some specified cut-off. For purposes of illustration, floorplan analyzer 116 may select the floorplan with the best average performance under a given maximum latency constraint. In one or more other example implementations, a machine learning model (e.g., an artificial intelligence model) may be trained to select a floorplan considered to provide the highest level of performance.

In block 824, constraint generator 118 is capable of generating one or more design constraints corresponding to the selected floorplan. The design constraints may cause implementation tools that perform a design flow on circuit design 128 to implement the kernels of circuit design 128 in locations that correspond to the placement, or assignment, of kernels to PPG circuit blocks in the selected floorplan. Further, the design constraints can cause the implementation tools to allocate memory interfaces of the kernels to the particular memories of IC 106 used by the floorplan.

In block 826, circuit design 128 may be implemented using the design constraint(s) generated in block 824. For example, the design constraints may be provided to an EDA system along with the kernel object files corresponding to the kernels of the circuit design. The EDA system is capable of linking the kernels and processing the linked circuit design through the remaining stages of a design flow. For example, the iterative process described herein may be performed between a compilation stage (e.g., High-Level Synthesis) of the circuit design and a linking stage (e.g., synthesis, placement and routing) of the circuit design.

Figure 9:
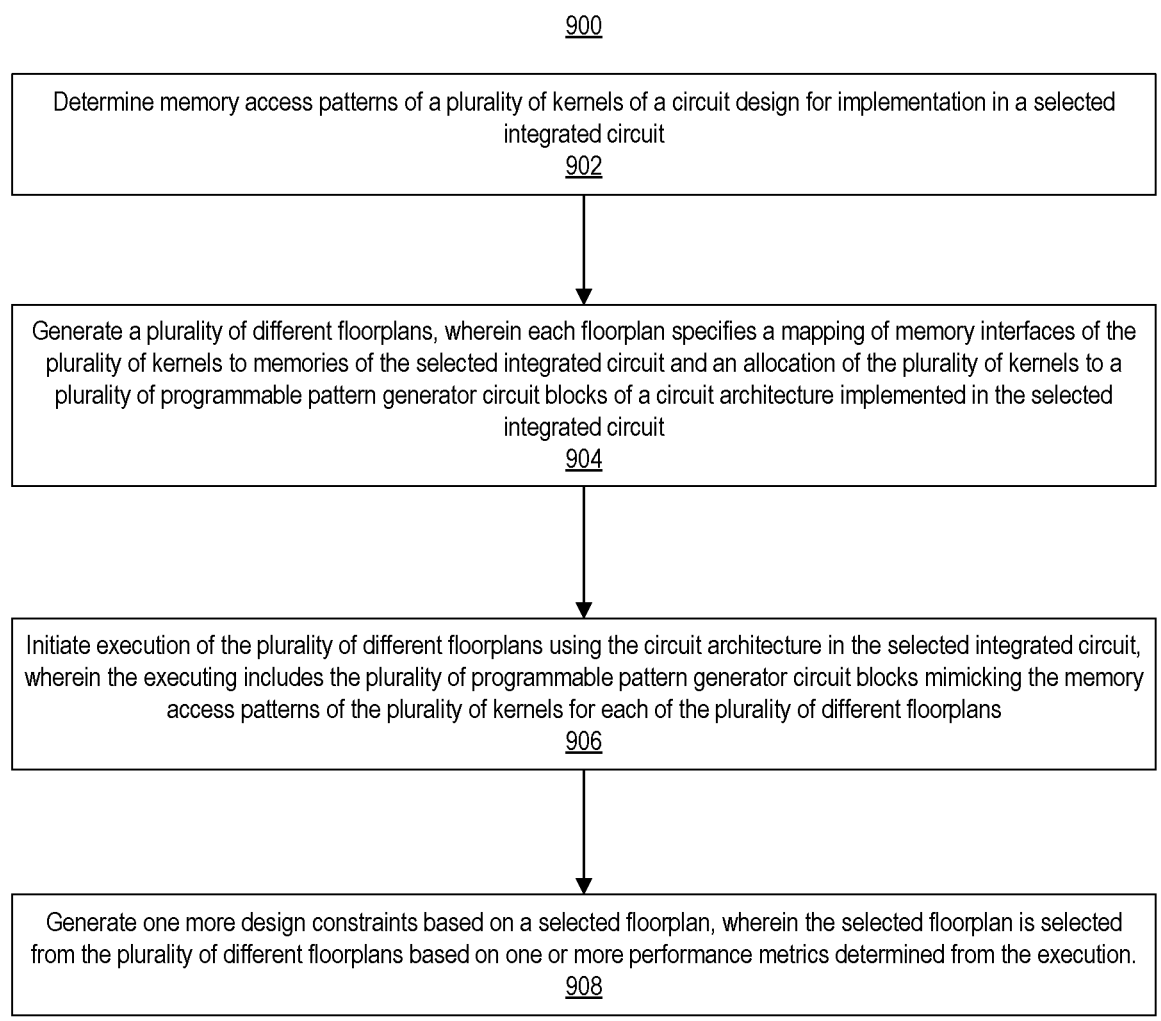
FIG. 9 is another example method illustrating certain operative features of the inventive arrangements described within this disclosure.

FIG. 9 is another example method 900 illustrating certain operative features of the inventive arrangements described within this disclosure. In block 902, memory access patterns of a plurality of kernels of a circuit design for implementation in a selected IC may be determined using computer hardware. The computer hardware may be implemented as a data processing system that is independent or distinct from the target IC, as a processor embedded in the target IC, or as a combination thereof. The computer hardware may execute HLS block 112 and MAP extractor 120 to generate memory access patterns 130.

In block 904, a plurality of different floorplans are generated using the computer hardware. For example, floorplan generator 114 is capable of generating the different floorplans. Each of the floorplans may specify a mapping of memory interfaces of the plurality of kernels to memories of the target IC and an allocation of the plurality of kernels to a plurality of PPG circuit blocks of a circuit architecture implemented in the target IC.

In block 906, execution of the plurality of different floorplans may be initiated by the computer hardware. The plurality of different floorplans are executed using the circuit architecture in the target IC. The execution of the plurality of different floorplans includes the plurality of PPG circuit blocks mimicking the memory access patterns of the plurality of kernels for each of the plurality of different floorplans.

In block 908, one or more design constraints may be generated using the computer hardware. The design constraints may be generated by constraint generator 118 based on a selected floorplan. The selected floorplan may be selected by floorplan analyzer 116 from the plurality of different floorplans based on one or more performance metrics determined from the execution.

The foregoing and other implementations can each optionally include one or more of the following features, alone or in combination. Some example implementations include all the following features in combination.

In one aspect, the one or more design constraints are based on the mapping of memory interfaces and the allocation of the plurality of kernels to the plurality of programmable pattern generator circuit blocks for the selected floorplan.

In another aspect, the method includes programming the target IC with the plurality of different floorplans.

In another aspect, for different floorplans of the plurality of different floorplans, the plurality of kernels are allocated to different ones of the plurality of programmable pattern generator circuit blocks.

In another aspect, for different floorplans of the plurality of different floorplans, the memory interfaces of the plurality of kernels are mapped to different ones of the plurality of memories of the integrated circuit.

In another aspect, each floorplan includes program code for programming selected PPG circuit blocks of the plurality of PPG circuit blocks to mimic the memory access patterns of selected ones of the plurality of kernels.

In another aspect, the method includes determining the one or more performance metrics for each of the plurality of different floorplans based on the execution of the plurality of different floorplans by the circuit architecture.

In another aspect, the one or more design constraints are used by an EDA system to guide computer-based operations of an implementation process for the circuit design.

Figure 10:
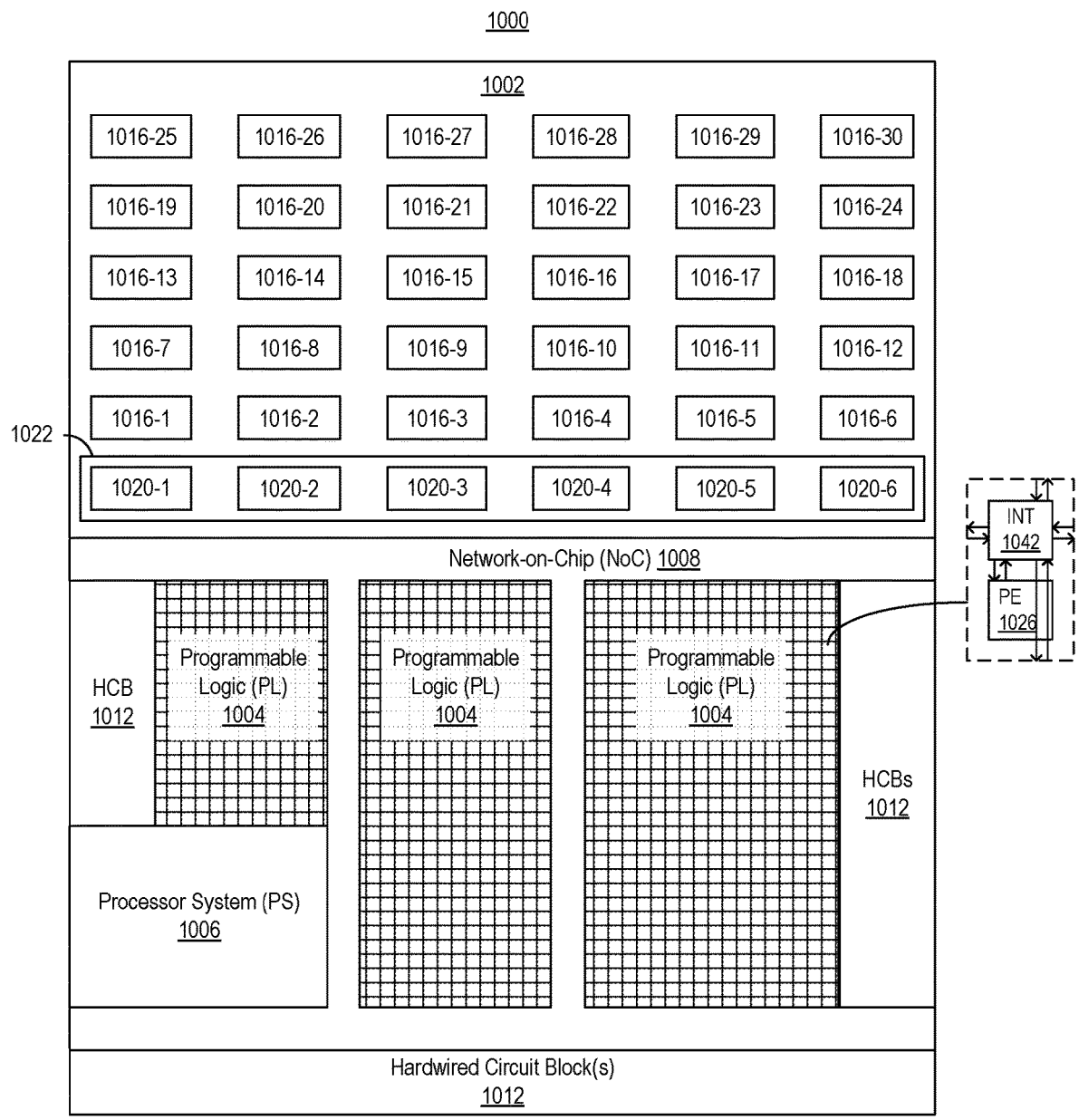
FIG. 10 illustrates an example architecture for an integrated circuit.

FIG. 10 illustrates an example architecture 1000 for an IC. Architecture 1000 or another architecture similar thereto may be used to implement IC 106. In the example of FIG. 10, architecture 1000 is implemented on a single die provided within a single package. In other examples, architecture 1000 may be implemented using a plurality of interconnected dies within a single package where the various resources of architecture 1000 (e.g., circuits) illustrated in FIG. 10 are implemented across the different interconnected dies.

In the example, architecture 1000 includes a plurality of different subsystems including a data processing (DP) array 1002, programmable logic (PL) 1004, a processor system (PS) 1006, a NoC 1008, and one or more hardwired circuit blocks 1012.

DP array 1002 is implemented as a plurality of interconnected and programmable data processing engines (DPEs) 1016. DPEs 1016 may be arranged in an array and are hardwired. Each DPE 1016 can include one or more cores and a data memory. Cores of DPEs 1016 are capable of executing program code stored in core-specific program memories contained within each respective core. As an example, a core of a DPE 1016 may be implemented as a vector processor capable of performing both fixed and floating-point operations and/or a scalar processor. Each DPE 1016 further includes dedicated multi-bit data movement channels connecting the DPEs 1016. Each DPE 1016 further can include support for direct memory access (DMA) operations. A DP array PPG circuit block may be formed of one or more interconnected DPEs 1016. In this regard, a DPE 1016 may include a DMA engine that may be accessed and/or controlled by the core.

It should be appreciated that the number of DPEs 1016 illustrated in FIG. 1 is for purposes of illustration. DP array 1002 may include more DPEs 1016 than shown where DP array 1002 includes more rows of DPEs 1016 and/or more columns of DPEs 1016. For example, in some cases, DP array 1002 may include hundreds of DPEs 1016. In other examples, DP array 1002 may include fewer DPEs 1016 than shown in FIG. 10. DP array 1002 may also include other types of circuit blocks such as memory tiles.

DP array 1002 includes an interface block 1022 that connects DPEs 1016 to other resources of architecture 1000. In the example of FIG. 10, interface block 1022 includes a plurality of interconnected tiles 1024 organized in a row. In one example, each of tiles 1024 may have a same architecture. In another example, tiles 1024 may be implemented with different architectures where each different tile architecture supports communication with different types of resources of architecture 1000. Tiles 1024 are connected so that data may be propagated from one tile to another bi-directionally. Each tile 1024 is capable of operating as an interface for the column of DPEs 1016 directly above.

PL 1004 is circuitry that may be programmed to perform specified functions. As an example, PL 1004 may be implemented as field programmable gate array type of circuitry. PL 1004 can include an array of programmable circuit blocks. As defined herein, the term "programmable logic" means circuitry used to build reconfigurable digital circuits. Programmable logic is formed of many programmable circuit blocks that provide basic functionality. The topology of PL 1004 is highly configurable unlike hardwired circuitry. Each programmable circuit block of PL 1004 typically includes a programmable element 1026 (e.g., a functional element) and a programmable interconnect 1042. The programmable interconnects 1042 provide the highly configurable topology of PL 1004. The programmable interconnects 1042 may be configured on a per wire basis to provide connectivity among the programmable elements 1026 of programmable circuit blocks of PL 1004 and is configurable on a per-bit basis (e.g., where each wire conveys a single bit of information) unlike connectivity among DPEs 1016, for example.

Examples of programmable circuit blocks of PL 1004 include configurable logic blocks having look-up tables and registers. Unlike hardwired circuitry described below and sometimes referred to as hardwired circuit blocks, these programmable circuit blocks have an undefined function at the time of manufacture. PL 1004 may include other types of programmable circuit blocks that also provide basic and defined functionality with more limited programmability. Examples of these circuit blocks may include digital signal processing blocks (DSPs), phase lock loops (PLLs), and block random access memories (BRAMs). These types of programmable circuit blocks, like others in PL 1004, are numerous and intermingled with the other programmable circuit blocks of PL 1004. These circuit blocks may also have an architecture that generally includes a programmable interconnect 1042 and a programmable element 1026 and, as such, are part of the highly configurable topology of PL 1004.

Prior to use, PL 1004, e.g., the programmable interconnect and the programmable elements, must be programmed or "configured" by loading data referred to as a configuration bitstream into internal configuration memory cells therein. The configuration memory cells, once loaded with a configuration bitstream, define how PL 1004 is configured, e.g., the topology, and operates (e.g., particular functions performed). Within this disclosure, a "configuration bitstream" is not equivalent to program code executable by a processor or computer.

PS 1006 is implemented as hardwired circuitry that is fabricated as part of architecture 1000. PS 1006 may be implemented as, or include, any of a variety of different processor types each capable of executing program code. For example, PS 1006 may be implemented as an individual processor, e.g., a single core capable of executing program code. In another example, PS 1006 may be implemented as a multi-core processor. In still another example, PS 1006 may include one or more cores, modules, co-processors, I/O interfaces, and/or other resources. PS 1006 may be implemented using any of a variety of different types of architectures. Example architectures that may be used to implement PS 1006 may include, but are not limited to, an ARM processor architecture, an x86 processor architecture, a graphics processing unit (GPU) architecture, a mobile processor architecture, a DSP architecture, combinations of the foregoing architectures, or other suitable architecture that is capable of executing computer-readable instructions or program code.

NoC 1008 is a programmable interconnecting network for sharing data between endpoint circuits in architecture 1000. The endpoint circuits can be disposed in DP array 1002, PL 1004, PS 1006, and/or selected hardwired circuit blocks 1012. NoC 1008 can include high-speed data paths with dedicated switching. In an example, NoC 1008 includes one or more horizontal paths, one or more vertical paths, or both horizontal and vertical path(s). The arrangement and number of regions shown in FIG. 10 is merely an example. NoC 1008 is an example of the common infrastructure that is available within architecture 1000 to connect selected components and/or subsystems.

Nets that are to be routed through NoC 1008 are unknown until a design is created for implementation within architecture 1000. NoC 1008 may be programmed by loading configuration data into internal configuration registers that define how elements within NoC 1008 such as switches and interfaces are configured and operate to pass data from switch to switch and among the NoC interfaces to connect the endpoint circuits. NoC 1008 is fabricated as part of architecture 1000 (e.g., is hardwired) and, while not physically modifiable, may be programmed to establish connectivity between different master circuits and different slave circuits of a user circuit design. NoC 1008, upon power-on, does not implement any data paths or routes therein. Once configured by a master circuit, however, NoC 1008 implements data paths or routes between endpoint circuits.

Hardwired circuit blocks 1012 are special-purpose circuit blocks fabricated as part of architecture 1000. Though hardwired, hardwired circuit blocks 1012 may be configured by loading configuration data into control registers to implement one or more different modes of operation. Examples of hardwired circuit blocks 1012 may include input/output (I/O) blocks, transceivers for sending and receiving signals to circuits and/or systems external to architecture 1000, memory controllers, or the like. Examples of different I/O blocks may include single-ended and pseudo differential I/Os. Examples of transceivers may include high-speed differentially clocked transceivers. Other examples of hardwired circuit blocks 1012 include, but are not limited to, cryptographic engines, digital-to-analog converters (DACs), analog-to-digital converters (ADCs), and the like. In general, hardwired circuit blocks 1012 are application-specific circuit blocks.

The various programmable circuit resources illustrated in FIG. 10 may be programmed initially as part of a boot process for architecture 1000. During runtime, the programmable circuit resources may be reconfigured. In one aspect, PS 1006 or another master circuit (not shown) included in architecture 1000 is capable of initially configuring DP array 1002, PL 1004, and NoC 1008. At any point during runtime, PS 1006 or another master circuit included in architecture 1000 may reconfigure all or a portion of architecture 1000.

In one or more example implementations, different subsystems described in connection with FIG. 10 may be optional. For example, DP array 1002, NoC 1008, PS 1006, and/or HCBs 1012 may be omitted individually or in various combinations. In cases where a processor is embedded in IC 106 (e.g., processor 302), such processor may be implemented using PS 1006 and/or implemented using PL 1004. As discussed, PPG circuit blocks may be implemented in PL 1004.

In the example of FIG. 10, EDA system 102 or selected functions performed by EDA system 102, may be implemented by PS 1006. In other example implementations, one or more functions of EDA system 102 may be implemented in circuitry realized using PL 1004.

FIG. 10 is provided for purposes of illustration and not limitation. Those skilled in the art will appreciate that various different types of ICs may be used having different architectures to implement IC 106 and that the particular overlay loaded therein will depend on the architecture of such IC.

Figure 11:
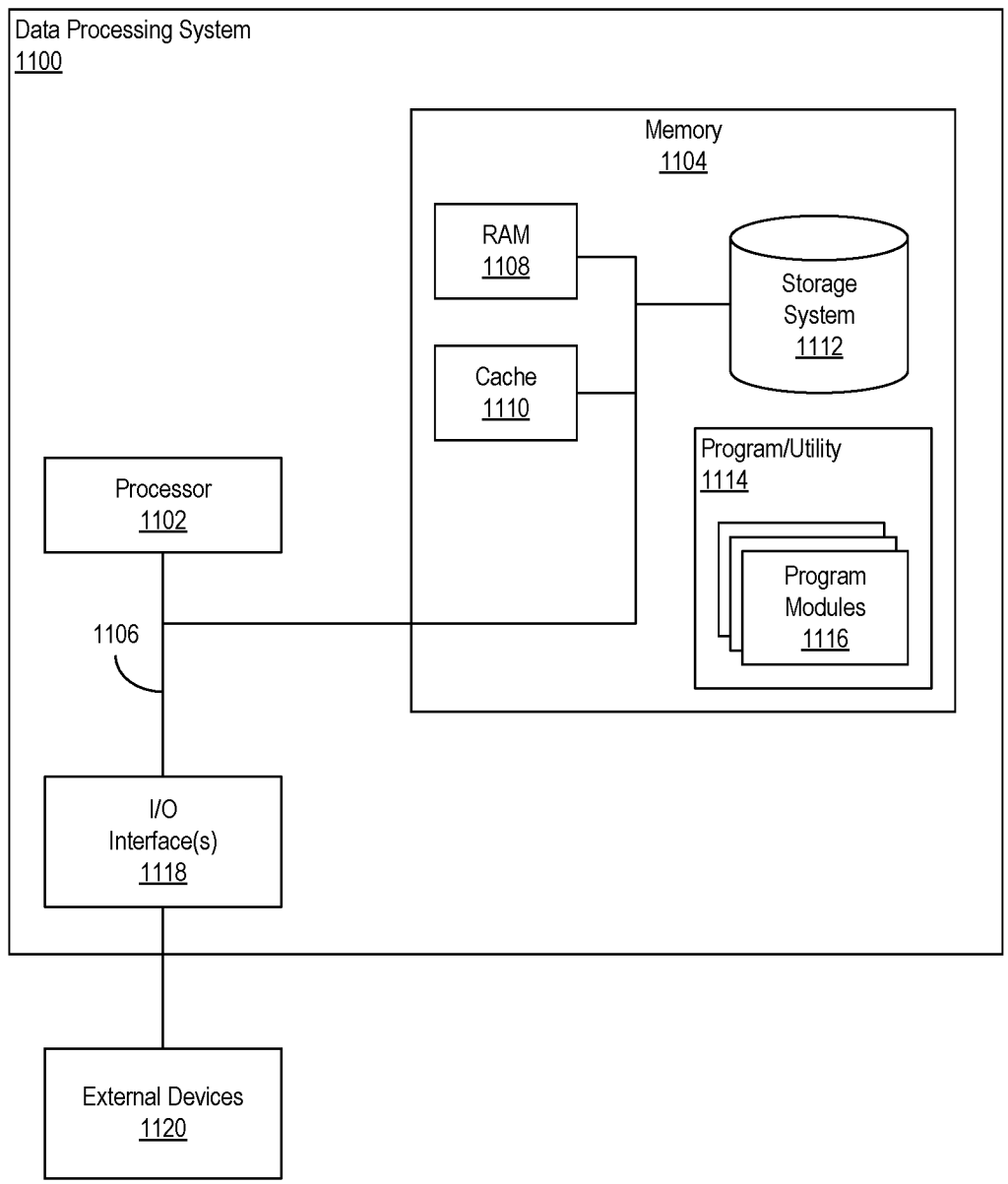
FIG. 11 illustrates an example of a data processing system for use with one or more of the inventive arrangements described herein.

FIG. 11 illustrates an example implementation of a data processing system 1100. The components of data processing system 1100 can include, but are not limited to, a processor 1102, a memory 1104, and a bus 1106 that couples various system components including memory 1104 to processor 1102. Processor 1102 may be implemented as one or more processors. In an example, processor 1102 is implemented as a central processing unit (CPU). Example processor types include, but are not limited to, processors having an x86 type of architecture (IA-32, IA-64, etc.), Power Architecture, ARM processors, and the like. Processor 1102 may be a "host processor" as previously described.

Bus 1106 represents one or more of any of a variety of communication bus structures. By way of example, and not limitation, bus 1106 may be implemented as a Peripheral Component Interconnect Express (PCIe) bus. Data processing system 1100 typically includes a variety of computer system readable media. Such media may include computer-readable volatile and non-volatile media and computer-readable removable and non-removable media.

Memory 1104 can include computer-readable media in the form of volatile memory, such as random-access memory (RAM) 1108 and/or cache memory 1110. Data processing system 1100 also can include other removable/non-removable, volatile/non-volatile computer storage media. By way of example, storage system 1112 can be provided for reading from and writing to a non-removable, non-volatile magnetic and/or solid-state media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1106 by one or more data media interfaces. Memory 1104 is an example of at least one computer program product.

Program/utility 1114, having a set (at least one) of program modules 1116, may be stored in memory 1104. By way of example, program modules 1116 may represent an operating system, one or more application programs, other program modules, and program data. Program modules 1116 generally carry out the functions and/or methodologies of the example implementations described within this disclosure. For example, one or more of program modules 1116 can implement EDA system 102, the drivers used to communicate with card 104, and/or any software capable of performing the various operations described within this disclosure upon execution by data processing system 1100.

Program/utility 1114 is executable by processor 1102. Program/utility 1114 and any data items used, generated, and/or operated upon by data processing system 1100 are functional data structures that impart functionality when employed by data processing system 1100.

Data processing system 1100 may include one or more Input/Output (I/O) interfaces 1118 communicatively linked to bus 1106. I/O interface(s) 1118 allow data processing system 1100 to communicate with one or more external devices 1120 and/or communicate over one or more networks such as a local area network (LAN), a wide area network (WAN), and/or a public network (e.g., the Internet). Examples of I/O interfaces 1118 may include, but are not limited to, network cards, modems, network adapters, hardware controllers, etc. Examples of external devices 1120 also may include devices that allow a user to interact with data processing system 1100 (e.g., a display, a keyboard, and/or a pointing device) and/or other devices such as circuit board 104.

Data processing system 1100 is only one example implementation. Data processing system 1100 can be practiced as a standalone device (e.g., as a user computing device or a server, as a bare metal server), in a cluster (e.g., two or more interconnected computers), or in a distributed cloud computing environment (e.g., as a cloud computing node) where tasks are performed by remote processing devices that are linked through a communications network. In a distributed cloud computing environment, program modules may be located in both local and remote computer system storage media including memory storage devices. The example of FIG. 11 is not intended to suggest any limitation as to the scope of use or functionality of example implementations described herein. Data processing system 1100 is an example of computer hardware that is capable of performing the various operations described within this disclosure.

In this regard, data processing system 1100 may include fewer components than shown or additional components not illustrated in FIG. 11 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

Data processing system 1100 may be operational with numerous other general-purpose or special-purpose computing system environments or configurations. Examples of computing systems, environments, and/or configurations that may be suitable for use with data processing system 1100 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Some computing environments, e.g., cloud computing environments and/or edge computing environments using data processing system 1100 or other suitable data processing system, generally support the FPGA-as-a-Service (FaaS) model. In the FaaS model, user functions are hardware accelerated as circuit designs implemented within programmable ICs operating under control of the (host) data processing system. Other examples of cloud computing models are described in the National Institute of Standards and Technology (NIST) and, more particularly, the Information Technology Laboratory of NIST.

Program modules 1116 also may include software that is capable of performing an implementation or design flow (e.g., computer-based operations such as HLS, synthesis, placement, and/or routing) on a circuit design or portion thereof. In this regard, data processing system 1100 serves as an example of an EDA system that is capable of processing circuit designs through a design flow.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

As defined herein, the singular forms "a," "an," and "the" are intended to include the plural forms as well, unless the context clearly indicates otherwise.

As defined herein, the term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention. As defined herein, the term "user" means a human being.

As used herein, the term "cloud computing" refers to a computing model that facilitates convenient, on-demand network access to a shared pool of configurable computing resources such as networks, servers, storage, applications, ICs (e.g., programmable ICs) and/or services. These computing resources may be rapidly provisioned and released with minimal management effort or service provider interaction. Cloud computing promotes availability and may be characterized by on-demand self-service, broad network access, resource pooling, rapid elasticity, and measured service.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer readable storage media. A non-exhaustive list of more specific examples of a computer readable storage medium may include: a portable computer diskette, a hard disk, a RAM, a read-only memory (ROM), an erasable programmable read-only memory (EPROM or Flash memory), an electronically erasable programmable read-only memory (EEPROM), a static random-access memory (SRAM), a portable compact disc read-only memory (CD-ROM), a digital versatile disk (DVD), a memory stick, a floppy disk, or the like.

As defined within this disclosure, the term "data structure" means a physical implementation of a data model's organization of data within a physical memory. As such, a data structure is formed of specific electrical or magnetic structural elements in a memory. A data structure imposes physical organization on the data stored in the memory as used by an application program executed using a processor.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, "data processing system" means one or more hardware systems configured to process data, each hardware system including at least one processor programmed to initiate operations and memory.

As defined herein, the term "processor" means at least one circuit capable of carrying out instructions contained in program code. The circuit may be an integrated circuit or embedded in an integrated circuit.

As defined herein, the term "output" means storing in physical memory elements, e.g., devices, writing to display or other peripheral output device, sending or transmitting to another system, exporting, or the like.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object-oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

What is claimed is:

1. A method, comprising:
    determining, using computer hardware, memory access patterns of a plurality of kernels of a circuit design for implementation in an integrated circuit;
    generating, using the computer hardware, a plurality of different floorplans, wherein each floorplan specifies a mapping of memory interfaces of the plurality of kernels to memories of the integrated circuit and an allocation of the plurality of kernels to a plurality of programmable pattern generator circuit blocks of a circuit architecture implemented in the integrated circuit;
    executing the plurality of different floorplans using the circuit architecture in the integrated circuit, wherein the executing includes the plurality of programmable pattern generator circuit blocks mimicking the memory access patterns of the plurality of kernels for each of the plurality of different floorplans; and
    generating, using the computer hardware, one or more design constraints based on a selected floorplan, wherein the selected floorplan is selected from the plurality of different floorplans based on one or more performance metrics determined from the executing.

2. The method of claim 1, wherein the one or more design constraints are based on the mapping of memory interfaces and the allocation of the plurality of kernels to the plurality of programmable pattern generator circuit blocks for the selected floorplan.

3. The method of claim 1, comprising:
    programming the integrated circuit with the plurality of different floorplans.

4. The method of claim 1, wherein, for different floorplans of the plurality of different floorplans, the plurality of kernels are allocated to different ones of the plurality of programmable pattern generator circuit blocks.

5. The method of claim 1, wherein, for different floorplans of the plurality of different floorplans, the memory interfaces of the plurality of kernels are mapped to different ones of the plurality of memories of the integrated circuit.

6. The method of claim 1, wherein each floorplan includes program code for programming selected programmable pattern generator circuit blocks of the plurality of programmable pattern generator circuit blocks to mimic the memory access patterns of selected ones of the plurality of kernels.

7. The method of claim 1, comprising:
    determining the one or more performance metrics for each of the plurality of different floorplans based on the execution of the plurality of different floorplans by the circuit architecture.

8. The method of claim 1, wherein the one or more design constraints are used by an electronic design automation system to guide computer-based operations of an implementation process for the circuit design.

9. A system, comprising:
    a processor configured to initiate operations including:
        determining memory access patterns of a plurality of kernels of a circuit design for implementation in an integrated circuit;
        generating a plurality of different floorplans, wherein each floorplan specifies a mapping of memory interfaces of the plurality of kernels to memories of the integrated circuit and an allocation of the plurality of kernels to a plurality of programmable pattern generator circuit blocks of a circuit architecture implemented in the integrated circuit;
        initiating execution of the plurality of different floorplans using the circuit architecture in the integrated circuit, wherein the plurality of programmable pattern generator circuit blocks mimic the memory access patterns of the plurality of kernels for each of the plurality of different floorplans during execution of the respective plurality of different floorplans; and
        generating one or more design constraints based on a selected floorplan, wherein the selected floorplan is selected from the plurality of different floorplans based on one or more performance metrics determined from the execution.

10. The system of claim 9, wherein the one or more design constraints are based on the mapping of memory interfaces and the allocation of the plurality of kernels to the plurality of programmable pattern generator circuit blocks for the selected floorplan.

11. The system of claim 9, wherein the processor is configured to initiate operations comprising:
programming the integrated circuit with the plurality of different floorplans.

12. The system of claim 9, wherein, for different floorplans of the plurality of different floorplans, the plurality of kernels are allocated to different ones of the plurality of programmable pattern generator circuit blocks.

13. The system of claim 9, wherein, for different floorplans of the plurality of different floorplans, the memory interfaces of the plurality of kernels are mapped to different ones of the plurality of memories of the integrated circuit.

14. The system of claim 9, wherein each floorplan includes program code for programming selected programmable pattern generator circuit blocks of the plurality of programmable pattern generator circuit blocks to mimic the memory access patterns of selected ones of the plurality of kernels.

15. The system of claim 9, wherein the processor is configured to initiate operations comprising:
determining the one or more performance metrics for each of the plurality of different floorplans based on the execution of the plurality of different floorplans by the circuit architecture.

16. The system of claim 9, wherein the one or more design constraints are used by an electronic design automation system to guide computer-based operations of an implementation process for the circuit design.

17. A computer program product, comprising:
one or more computer readable storage media, and program instructions collectively stored on the one or more computer readable storage media, wherein the program instructions are executable by computer hardware to initiate operations including:
determining memory access patterns of a plurality of kernels of a circuit design for implementation in an integrated circuit;
generating a plurality of different floorplans, wherein each floorplan specifies a mapping of memory interfaces of the plurality of kernels to memories of the integrated circuit and an allocation of the plurality of kernels to a plurality of programmable pattern generator circuit blocks of a circuit architecture implemented in the integrated circuit;
initiating execution of the plurality of different floorplans using the circuit architecture in the integrated circuit, wherein the plurality of programmable pattern generator circuit blocks mimic the memory access patterns of the plurality of kernels for each of the plurality of different floorplans during execution of the respective plurality of different floorplans; and
generating one or more design constraints based on a selected floorplan, wherein the selected floorplan is selected from the plurality of different floorplans based on one or more performance metrics determined from the execution.

18. The computer program product of claim 17, wherein the one or more design constraints are based on the mapping of memory interfaces and the allocation of the plurality of kernels to the plurality of programmable pattern generator circuit blocks for the selected floorplan.

19. The computer program product of claim 17, wherein, for different floorplans of the plurality of different floorplans, at least one of:
the plurality of kernels are allocated to different ones of the plurality of programmable pattern generator circuit blocks; or
the memory interfaces of the plurality of kernels are mapped to different ones of the plurality of memories of the integrated circuit.

20. The computer program product of claim 19, wherein each floorplan includes program code for programming selected programmable pattern generator circuit blocks of the plurality of programmable pattern generator circuit blocks to mimic the memory access patterns of selected ones of the plurality of kernels.

\* \* \* \* \*